US012569408B2

(12) United States Patent
Hu et al.

(10) Patent No.: US 12,569,408 B2
(45) Date of Patent: Mar. 10, 2026

(54) METHOD AND DEVICE FOR CONTROLLING A NUTRIENT PUMP

(71) Applicant: Medcaptain Medical Technology Co., Ltd., Shenzhen (CN)

(72) Inventors: Ling Hu, Shenzhen (CN); Yazhou Tang, Shenzhen (CN); Xiaocheng Tang, Shenzhen (CN)

(73) Assignee: Medcaptain Medical Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/928,027

(22) Filed: Oct. 27, 2024

(65) Prior Publication Data

US 2025/0134778 A1 May 1, 2025

(30) Foreign Application Priority Data

Oct. 27, 2023 (CN) ......................... 202311423057.8

(51) Int. Cl.
*A61J 15/00* (2006.01)

(52) U.S. Cl.
CPC ................................. *A61J 15/0076* (2015.05)

(58) Field of Classification Search
CPC ................ A61J 15/0076; A61J 15/0084; A61J 15/0092; A61J 2200/70; A61J 15/0003; Y02A 40/81; G16H 20/60
See application file for complete search history.

(56) References Cited

U.S. PATENT DOCUMENTS

2016/0143817 A1* 5/2016 Elia ......................... G16H 40/63
604/503
2020/0281819 A1* 9/2020 Elia .................. A61M 5/16854

FOREIGN PATENT DOCUMENTS

WO WO-2014179594 A2 * 11/2014 ........... A61B 5/4866
WO WO-2016187456 A1 * 11/2016 ........... A61B 5/0536
WO WO-2018185738 A1 * 10/2018 ........... A61B 5/0833

* cited by examiner

*Primary Examiner* — Wesley G Harris
(74) *Attorney, Agent, or Firm* — Jeffrey Pearce

(57) ABSTRACT

The invention provides a method and device for controlling a nutrient pump. Feeding subject information is obtained and a target feeding amount is determined according to the feeding subject information. The target feeding amount comprises target energy content and/or target nutrient amount. The nutrient pump then outputs a target nutrient according to the target feeding amount. The invention combines the feeding subject information with respect to different categories to determine the target feeding amount, which can improve the accuracy of the target feeding amount, and thus improve the feeding accuracy. Moreover, invention can be executed by a control device, which can acquire the feeding subject information to realize intelligent feeding, and thus avoid being affected by the working hours of the nutrition team, thereby improving time flexibility.

13 Claims, 7 Drawing Sheets

METHOD AND DEVICE FOR CONTROLLING A NUTRIENT PUMP

REFERENCE TO RELATED APPLICATIONS

The invention claims priority of Chinese Patent Application No. 202311423057.8, entitled "Method and Device for Controlling Nutrient pump" filed with the China National Intellectual Property Administration on Oct. 27, 2023, which is incorporated herein by reference in its entirety.

TECHNICAL FIELD

This invention generally relates to the field of feeding technologies, and more particularly, to a method and a device for controlling a nutrient pump.

BACKGROUND ART

In clinical medicine, nutritional feeding of patients is required in order to maintain their vital signs, so that they consume the nutrients necessary for proper functioning of the body. Nutrients may include such substances as, for example, proteins, various vitamins, water, and the like, as well as those whose main purpose is to give the patient energy.

In the prior art, a specialized nutrition team needs to set up a feeding strategy according to experience, where the feeding strategy includes, but is not limited to: nutrient, feeding rate, feeding duration, feeding mode, and the like. After setting the feeding strategy, the healthcare worker can follow the feeding strategy to infuse the nutrient into the patient via a nutrient pump control device.

However, the above-described solution suffers from poor nutritional feeding accuracy and poor time flexibility.

SUMMARY OF THE INVENTION

The invention provides a method and device for controlling a nutrient pump to improve nutritional feeding accuracy and timing flexibility.

In a first aspect, the invention provides a method for controlling a nutrient pump, comprising:

obtaining feeding subject information;

determining a target feeding amount according to the feeding subject information, wherein the target feeding amount comprises target energy and/or target nutrient amount; and controlling the nutrient pump to output a target nutrient according to the target feeding amount.

In some embodiments, the step of controlling the nutrient pump to output the target nutrient according to the target feeding amount comprises:

obtaining target nutrient information;

controlling the nutrient pump to output the target nutrient according to the target nutrient information and the target feeding amount.

In some embodiments, the step of controlling the nutrient pump to output the target nutrient according to the target nutrient information and the target feeding amount comprises:

determining a feeding mode and/or a feeding parameter according to the target feeding amount and the target nutrient information, or, according to the target feeding amount, the target nutrient information and the feeding subject information; and controlling the nutrient pump to output the target nutrient according to the feeding mode and/or the feeding parameter.

In some embodiments, after the step of determining the target feeding amount according to the feeding subject information, the method further comprises:

obtaining a feeding amount ratio;

adjusting the target feeding amount according to the feeding amount ratio.

In some embodiments, the feeding subject information comprises at least one of the following: basic information, vital sign information, disease information, laboratory result information, and remaining ingestion information other than the target nutrient;

wherein the basic information comprises at least one of the following: height, weight, gender, and age; the vital sign information comprises at least one of the following: oxygen consumption and carbon dioxide production; the disease information comprises at least one of the following: disease type, disease severity stage, number of days of hospitalization, and hemodynamic parameter; and the remaining ingestion information comprises the energy included in the remaining ingestion and/or the nutrient amount included in the remaining ingestion.

In some embodiments, the step of obtaining the target nutrient information comprises:

determining the target nutrient information according to the target energy, the target nutrient amount and alternative nutrient information.

In some embodiments, the method further comprises:

acquiring a fed amount corresponding to a current time; and displaying the fed amount and the target feeding amount.

In a second aspect, the invention provides an apparatus for controlling a nutrient pump, comprising:

a feeding subject (that is, the patient being fed) information acquisition module configured to obtain feeding subject information;

a feeding amount determination module configured to determine a target feeding amount according to the feeding subject information, wherein the target feeding amount comprises target energy and/or target nutrient amount; and a nutrient pump control module configured to control a nutrient pump to output a target nutrient according to the target feeding amount.

In some embodiments, the nutrient pump control module is further configured to:

obtain target nutrient information; and control the nutrient pump to output the target nutrient according to the target nutrient information and the target feeding amount.

In some embodiments, the nutrient pump control module is further configured to:

determine a feeding mode and/or a feeding parameter according to the target feeding amount and the target nutrient information, or, according to the target feeding amount, the target nutrient information and the feeding subject information; and control the nutrient pump to output the target nutrient according to the feeding mode and/or the feeding parameter.

In some embodiments, the apparatus further comprises:

a ratio obtaining module configured to obtain a feeding amount ratio after the target feeding amount is determined according to the feeding subject information; and a feeding amount adjustment module configured to adjust the target feeding amount according to the feeding amount ratio.

In some embodiments, the feeding subject information comprises at least one of the following: basic information, vital sign information, disease information, laboratory result information, and remaining ingestion information other than the target nutrient;

wherein the basic information comprises at least one of the following: height, weight, gender, and age; the vital sign information comprises at least one of the following: oxygen consumption and carbon dioxide production; the disease information comprises at least one of the following: disease type, disease severity stage, number of days of hospitalization, and hemodynamic parameter; and the remaining ingestion information comprises at least one of the following: energy included in the remaining ingestion, nutrient amount included in the remaining ingestion.

In some embodiments, the nutrient pump control module is further configured to determine the target nutrient information according to the target energy, the target nutrient amount and alternative nutrient information.

In some embodiments, the apparatus further comprises:

a fed amount acquisition module configured to acquiring the fed amount corresponding to the current time; and a feeding amount display module configured to display the fed amount and the target feeding amount.

In a third aspect, the invention provides a nutrient pump control device comprising: at least one processor and a memory. The memory is configured to store computer-executable instructions and the at least one processor is configured to process the computer-executable instructions stored in the memory to cause the device to realize the method as in the preceding first aspect.

In a fourth aspect, the invention provides a feeding system comprising: a delivery tubing, a driving mechanism, and at least one processor and a memory. The memory is configured to store computer-executable instructions and the processor is configured to process the computer-executable instructions stored in the memory to cause the device to implement the method as in the first aspect.

In a fifth aspect, the invention provides a computer-readable storage medium having computer-executable instructions stored thereon. The computer-executable instructions, when executed by the processor, cause an electronic device to implement the method as in the first aspect.

In a sixth aspect, the invention provides a computer program, the computer program being used to implement the method as in the preceding first aspect.

The invention provides a method and device for controlling a nutrient pump, and the method includes: obtaining feeding subject information; determining a target feeding amount according to the feeding subject information, wherein the target feeding amount comprises at least one of the following: target energy and target nutrient amount; and controlling the nutrient pump to output a target nutrient according to the target feeding amount. In the invention, a suitable target feeding amount for a specific feeding subject is determined, thereby improving the accuracy of the target feeding amount and thus improving the feeding accuracy. Moreover, the method of the invention may be performed by a nutrient pump control device, which can acquire feeding subject information to realize intelligent (for example, using machine learning, or simply automatic) feeding, and thus avoid being affected by the working hours of the nutrition team, thereby improving time flexibility.

BRIEF DESCRIPTION OF THE DRAWINGS

In order to more clearly illustrate the technical solutions in the embodiments of the invention, the accompanying drawings to be used in the description of embodiments or prior art will be briefly described below. The drawings illustrate only some of the embodiments of the invention.

DETAILED DESCRIPTION

Figure 1:
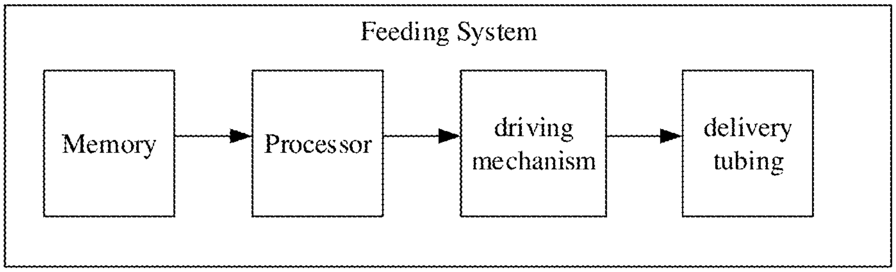
FIG. 1 is a schematic structural diagram of a feeding system according to an embodiment of the invention.

In order to make the object, technical solutions and advantages of the embodiments of the invention clearer, the technical solutions in the embodiments of the invention will be described clearly and completely in the following in conjunction with the accompanying drawings in the embodiments of the invention. The described embodiments are only some of those that the invention encompasses and a person of ordinary skill in the art will be able to implement other embodiments given this description without needing creative effort.

Embodiments of the invention are used to feed a nutritional solution (nutrient) to a feeding subject, for example, a patient. The feeding subject may be any biological subject that is dependent on nutrition and energy, for example, it may be a human patient, an animal, and the like. The nutrient is any substance that can provide energy and/or nutrition to the feeding subject.

In the prior art, feeding nutrients to a feeding subject relies heavily on a nutrition team based on their experience.

However, the accuracy of such a scheme depends on the knowledge of the nutrition team, and can result in less accurate nutritional feeding when the nutrition team is not specialized in this field. In addition, this scheme is limited by the working hours of the nutrition team, resulting in less time flexibility.

In one example of an application scenario, the feeding target is an Intensive Care Unit (ICU) patient, and the nutrition team needs to feed the patient for nutritional support therapy. However, when the working hours of the nutrition team are from 9:00 a.m. to 5:00 p.m. from Monday to Saturday, this will result in the ICU patients not being able to be fed professionally outside of those working hours. This can be detrimental to the patient's health, which means that patient feeding is limited by the nutrition team's work hours and has less time flexibility. In addition, the accuracy of the feeding performed by the nutrition team is affected by human factors, which can lead to less accurate feeding in case of human negligence.

In order to address the above technical and practical issues, embodiments of the invention determine a target feeding amount to be fed to a feeding subject along with feeding subject information, so as to determine the appropriate nutrition and energy delivery for the feeding subject. The feeding subject information is used to describe the nutrient and energy needs of the feeding subject with respect to one or more main categories. The more comprehensive the feeding subject information is, the more accurately the target feeding amount can be improved, which in turn improves the feeding accuracy and does not result in poorer feeding accuracy due to human negligence. Moreover, the method of the embodiments of the invention may be performed by a nutrient pump control device, which can obtain the feeding subject information to realize intelligent feeding, and thus avoid being affected by the working hours of the nutrition team, thereby improving time flexibility.

FIG. 1 is a schematic structural diagram of a feeding system 10 according to an embodiment of the invention. As shown in FIG. 1, the feeding system 10 provided by embodiments of the invention may include: delivery tubing 11, a driving mechanism 12, at least one processor 13, and a memory 14.

The delivery tubing 11 is configured to deliver the nutrient to the feeding subject, and the driving mechanism 12 is configured to drive or squeeze the delivery tubing to output the nutrient to the feeding subject. The memory 14 is configured to store computer-executable instructions, and the processor 13 can carry out the method for controlling the nutrient pump provided by embodiments of the invention executing the above computer-executable instructions.

The method for controlling a nutrient pump of the invention may be performed by any device, not just the nutrient pump itself. For example, a device other than the nutrient pump itself might be a device for controlling the nutrient pump or a central station. In specific implementations, the device for controlling the nutrient pump may be a terminal such as a computer or other medical device such as a monitor, infusion workstation, anesthesia machine, ventilator, and the like.

In some embodiments, the method for controlling the nutrient pump of the embodiments of the invention may be performed by the nutrient pump itself. In this case, the feeding system 10 shown in FIG. 1 above can be understood as a nutrient pump that includes the memory 14, the processor 13, the driving mechanism 12, and the delivery tubing 11.

In other embodiments, the method for controlling the nutrient pump of embodiments of the invention may performed by a nutrient pump control device, separate from the nutrient pump itself. In such embodiments, the feeding system 10 shown in FIG. 1 above may include a nutrient pump and a nutrient pump control device. The nutrient pump may then include the driving mechanism 12 and the delivery tubing 11 shown in FIG. 1, whereas the nutrient pump control device may include the memory 14 and the processor 13.

Figure 2:
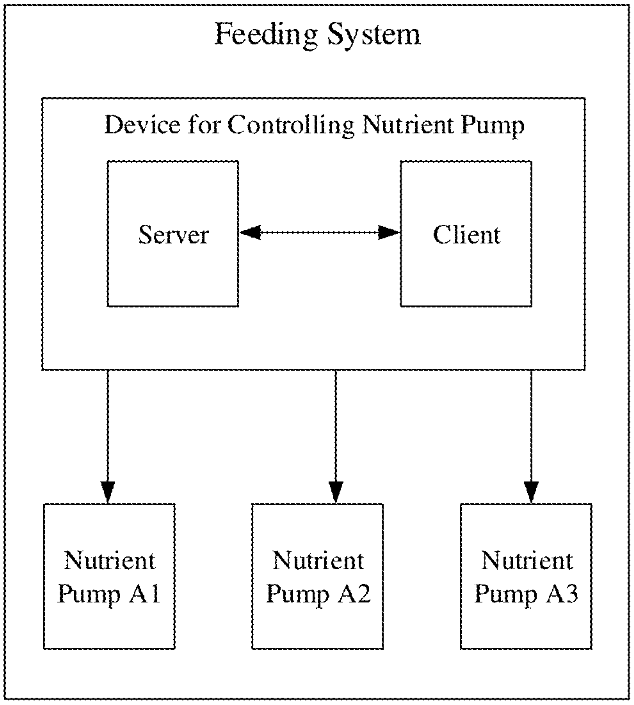
FIG. 2 is a schematic structural diagram of another feeding system according to an embodiment of the invention.

It should be noted that one nutrient pump control device could be used to control one or more nutrient pumps. FIG. 2 is a schematic structural diagram of another feeding system 20 according to an embodiment of the invention. As shown in FIG. 2, one nutrient pump control device 21 may control more than one nutrient pump—in the figure, three pumps 24, 25, 26 are shown—to output target nutrient. Different nutrient pumps may be used to output the same or different target nutrients to the same or different feeding subjects.

In addition, the nutrient pump control device 21 of FIG. 2 above may be configured according to a server-client arrangement, with a server 22 and a client 23 that communicate with each other.

The client 23 may include standard components (not illustrated) such as a display, an input/output component and a communication component, etc., for carrying out information display, information input, and information issuance. The client may include, for example, components to carry out any or all of functions such as nutrient pump management, feeding subject management, nutrient library management, nutrient recommendation, and feeding program issuance.

The server 22 may include standard components (not shown) such as a memory, a processor, and a communication component, etc., for performing data calculation, data storage, and data analysis. The client and the server in this embodiment of the invention may be set up within the same physical device, or may be set up in different physical devices. Moreover, if the client and the server are set within the same physical device, related components may be shared.

Figure 3:
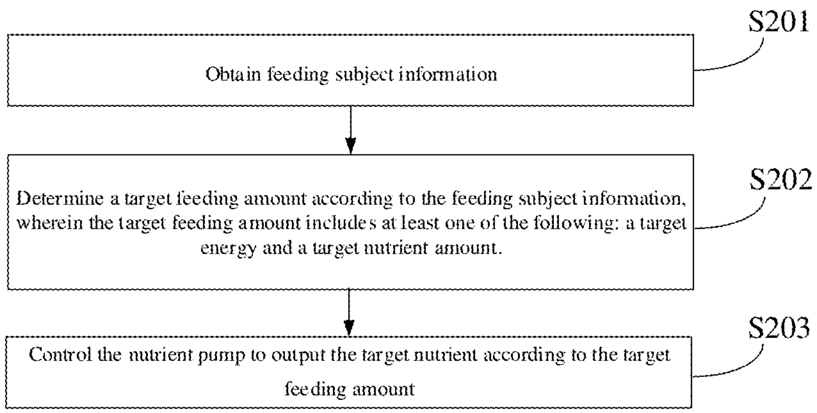
FIG. 3 is a flowchart of a method of controlling a nutrient pump according to an embodiment of the invention.

FIG. 3 is a flowchart of a method for controlling a nutrient pump according to one embodiment of the invention. As shown in FIG. 3, the method may include the following steps:

S201, feeding subject information is obtained.

The feeding subject information is used to describe the feeding subject's need for nutrition and energy with respect to one or more main categories, that is, the feeding subject information may include any information of the feeding subject that affects the subject's need for nutrition and energy. In one example, the feeding subject information may include, but is not limited to: basic information, vital sign information, disease information, lab result information, and remaining ingestion information other than the target nutrient.

The basic information may include, but is not limited to: height, weight, gender, and age. It should be understood that for feeding subjects of different heights, and/or weights, and/or genders, and/or ages, the different metabolic capabilities of the body will result in different nutritional and energy requirements. For example, as height increases, the feeding subject's nutrient and energy needs generally increase, and as body weight increases, the nutrient and energy needs of feeding subjects also generally increase. Males typically have greater nutrient and energy needs than female and as age increases, the feeding subject's need for nutrients and energy often increases and then decreases.

Vital sign information includes oxygen consumption and/or carbon dioxide (CO2) production. Oxygen consumption and carbon dioxide production can also be indicative of the nutrient and energy needs of a feeding subject. For example, the feeding subject's need for nutrients and energy increases when either oxygen consumption or CO2 production increases.

Disease information may include at least one of the following: type of disease, stage of disease severity, number of days in the hospital, and hemodynamic parameters. For different disease types, and/or different disease criticality stages, and/or different days of admission, and/or different hemodynamic parameters, the feeding subjects may have different physical conditions, which in turn results in different nutrient and energy needs of the feeding subjects. The stage of disease severity may include, but is not limited to: early, middle, late, etc.

The remaining ingestion information may include the energy included in the remaining ingestion and/or the nutrient amounts included in the remaining ingestion. For example, the remaining ingestion may be glucose, isoproterenol, citrate from Continuous Veno-Venous Hemofiltration (CVVH) therapy, or some other non-nutritive medications.

The above feeding subject information of the embodiments of the invention may be a default value given by the system, manually entered by the user, or automatically obtained from other devices. Embodiments of the invention are not limited by how this information is obtained. For example, it may be acquired from a patient management system of a hospital, or from a detecting device.

S202, a target feeding amount is determined according to the feeding subject information and includes the target energy and/or a target nutrient amount.

The target feeding amount is an amount to be fed within a predetermined time period; similarly, the target energy is the amount of energy to be fed within the predetermined time period, and the target nutritional amount is the nutritional amount to be fed within the predetermined time period. For example, the target feeding amount may be the amount to be fed in one day, the target energy may be the energy content to be fed in one day, and the target nutrient amount may be the nutrient amount to be fed in one day.

Energy content may be expressed in any unit and is often expressed in Kcal (kilocalories). Nutrients are substances that are necessary for the body to function and may include, but are not limited to, one or more of the following: proteins, vitamins, fats, and minerals.

In the process of determining the target feeding amount, the feeding target information may be input into a formula, or algorithmic model, or mapping relationship table, etc., and the corresponding target feeding amount can be obtained. The target energy and the target nutrient amount may correspond to different target formulas, or different algorithmic models, or different machine learning models, or different mapping relationship tables.

The above target formulas, algorithmic models, and mapping relationship tables may be given by default, or may be input by the user, or may be selected by the user from a plurality of target formulas, or algorithmic models, or mapping relationship tables.

In some embodiments, the target feeding amount described above may also be obtained by measuring the feeding subject by direct calorimetry or indirect calorimetry via a measuring device, and may also be obtained by calculating a target feeding amount according to a target formula customized according to clinical experience.

As can be understood, the invention can determine and ensure the accuracy of the target feeding amount of the feeding subject according to the feeding subject information, and is a personalized, suitable feeding amount for the feeding subject

S203, the nutrient pump is controlled to output the target nutrient according to the target feeding amount.

The above target nutrient may be a default nutrient, may be selected by the user from a nutrient library, or may be intelligently determined from the nutrient library.

It should be noted that one or more nutrient pumps may be configured to deliver one or more target nutrient(s). According to practical needs, the output of one or more target nutrients may be controlled by one nutrient pump, or the output of one or more target nutrients may be controlled by a plurality of nutrient pumps. For convenience of illustration, the embodiments of the invention are subsequently illustrated with one target nutrient and one nutrient pump by way of example only; the principles of multiple target nutrients and multiple nutrient pumps are similar and will not be repeated herein.

The nutrient library may be included and used to store information related to at least one alternative nutrient (referred to as alternative nutrient information). The alternative nutrient information may include, but is not limited to, one or more of: an alternative nutrient identification, a nutrient amount per unit package, an energy concentration, a nutrient amount concentration, a second proportional relationship between the energy concentration and the nutrient amount concentration, and the like. The nutrient pump is controlled to output a target nutrient for feeding the feeding subject.

The nutrient identification may be used to only indicate the nutrient, which may be a nutrient name, a code, a model, a brand, a nutrient name, etc., and the embodiment of the invention is illustrated by using the name of the nutrient as the nutrient identification as an example.

The nutrient amount per unit package may be used to indicate the nutrient amount in the unit package. For example, the unit package may be a packet, the nutrient amount may be expressed in milliliters, and thus the unit of the unit package nutrient amount may be milliliters per packet. The energy concentration may be used to express the energy contained in each unit amount of the alternative nutrient. For example, each unit amount may be milliliters (ml), the energy may be expressed in kilocalories, and the unit of the energy concentration may be expressed as kilocalories/ml.

The nutrient concentration may be used to represent the nutrient amounts contained in the alternative nutrient per unit amount. For example, the nutrient amounts may be expressed in grams (g), and the unit of the nutrient concentration may be grams per milliliter (g/ml).

A second proportionality relationship may be used to indicate a ratio of energy to nutrient amount in the alternative nutrient, which may be a ratio of energy concentration to nutrient amount concentration, or, a ratio of nutrient amount concentration to energy concentration.

Table 1 is an example of a nutrient library provided by embodiments of the invention.

TABLE 1

| Name of Alternative Nutrient | Energy Concentration | Nutrient amount Concentration | Energy Concentration/Nutrient amount Concentration |
|---|---|---|---|
| P1 | C1 | C5 | C1/C5 |
| P2 | C2 | C6 | C2/C6 |
| P3 | C3 | C7 | C3/C7 |
| P4 | C4 | C8 | C4/C8 |

Users may also manage the nutrient library shown in Table 1 above, including but not limited to: deleting, adding, and modifying. A management interface may be provided to perform deletion, addition and modification in the library.

Figure 4:
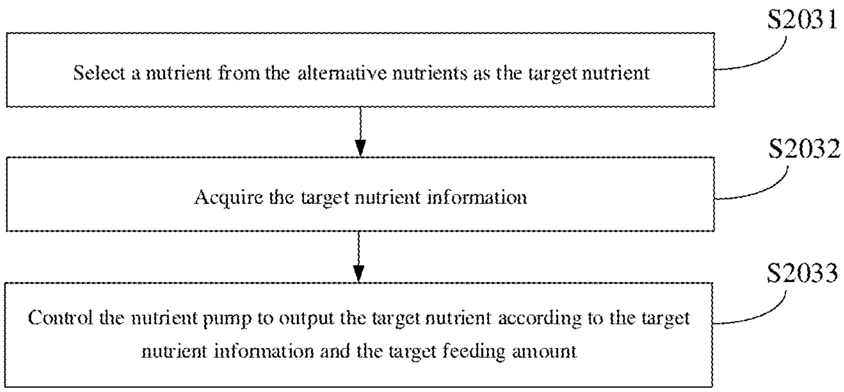
FIG. 4 is a flowchart of a nutrient-based control method for a nutrient pump according to an embodiment of the invention.

As shown in FIG. 4, the above S203 may include the following steps.

S2032, the target nutrient information is acquired.

S2033, the nutrient pump is controlled to output the target nutrient according to the target nutrient information and the target feeding amount.

The target nutrient information may include, but is not limited to, one or more of: a target nutrient identification, a nutrient amount per unit package, an energy concentration, a nutrient concentration, a second proportionality relationship between the energy concentration and the nutrient concentration. The target nutrient identification indicates the target nutrient output to the feeding recipient, which may be a name, model number, or logo of the nutrient, etc., and it uniquely identifies a nutrient.

For the case where the target nutrient has been determined, the target nutrient information may be directly acquired, and the nutrient pump is then controlled to output the target nutrient according to the target nutrient information and the target feeding amount.

For the case where the target nutrient is not determined, before step S2032, the above step S203 may also include the following steps as shown in FIG. 4.

S2031, a nutrient from the alternative nutrients is selected as the target nutrient.

In some implementations, an alternative nutrient may be selected as the target nutrient from one or more alternative nutrients according to a selection rule, user operation, or randomly. Then, target nutrient information corresponding to the selected target nutrient may be acquired in step S2032.

When selecting a nutrient from the alternative nutrients as the target nutrient according to the selection rule, this may include the following steps.

A nutrient may be selected from the alternative nutrients as the target nutrient according to the selection rule, or, an alternative nutrient is selected from the alternative nutrients as the target nutrient according to the target feeding amount and the selection rule.

Here, the selection rule may define a rule for selecting a target nutrient from the alternative nutrients, which may be selected according to the matching degree, that is, degree of correspondence, between the alternative nutrients and the target energy and/or target nutrient amount, and the one alternative nutrient with the highest matching degree is selected as the target nutrient. It is also possible to comprehensively consider the matching degree between energy and nutrient amount and set different weights for energy and nutrient amount. It is also possible to comprehensively consider the matching degree between energy and nutrient amount, and the best alternative nutrient is selected as the target nutrient.

In one implementation, firstly, an energy concentration and/or a nutrient amount concentration of the alternative nutrient is acquired from the alternative nutrient information. Then, the energy and/or nutrient amount included in each unit packaged nutrient amount is determined according to the energy concentration and nutrient amount concentration of the alternative nutrient. Finally, the energy included in each unit packaged nutrient amount is matched to the target energy, and/or, the nutrient amount included in each unit packaged nutrient amount is matched to the target nutrient amount. Thus, in the event that at least one of these two matches is successful, the corresponding alternative nutrient is used as the target nutrient. In some examples, the nutrient identification corresponding to when the energy included in each unit packaged nutrient amount matches the target energy is referred to as a first nutrient identification, and the nutrient identification corresponding to when the nutrient amount included in each unit packaged nutrient amount matches the target nutrient amount is referred to as a second nutrient identification.

When the first nutrient identification and the second nutrient identification are the same, the first nutrient identification and the second nutrient identification are used as the target nutrient identification.

When the first nutrient identification and the second nutrient identification are different, the first nutrient corresponding to the first nutrient identification and the second nutrient corresponding to the second nutrient identification are first determined. Then, the energy and nutrient amount included in the first nutrient with a unit packaged nutrient amount are determined. Next, an absolute value of a difference between the energy included in the first nutrient with a unit packaged nutrient amount and the target energy is calculated and referred to as the first difference value, and an absolute value of a difference between the nutrient amount included in the second nutrient with a unit packaged nutrient amount and the target nutrient amount is referred to as the second difference. Finally, when the first difference is smaller than the second difference, the first nutrient identification will be used as the target nutrient identification. When the first difference is larger than the second difference, the second nutrient identification will be used as the target nutrient identification. When the first difference is equal to the second difference, one may be selected as the target nutrient identification according to the frequency of use or the last use, or the first nutrient identification or the second nutrient identification may be randomly selected as the target nutrient identification.

The energy included in the unit packaged nutrient amount of the above alternative nutrient is the product of the unit packaged nutrient amount of the alternative nutrient and the energy concentration of the alternative nutrient, and the nutrient amount included in the unit packaged nutrient amount of the alternative nutrient is the product of the unit packaged nutrient amount and the nutrient concentration of the alternative nutrient. For example, if the energy concentration of the alternative nutrient is 1 kcal/mL, the nutrient amount concentration of the alternative nutrient is 0.1 g/mL, and the unit packaged nutrient amount of the alternative nutrient may be 100 mL, then the energy included in 100 ml of the alternative nutrient may be $100\times1=100$ kcal, and the nutrient amount included in 100 ml of the alternative nutrient may be $100\times0.1=10$ grams. The specific manner of comparison is as described above and will not be repeated.

From the above description, it can be seen that if the energy included in the nutrient amount in each unit package of the alternative nutrient is comparable to the target energy, and/or if the nutrient amount included in the nutrient amount in each unit package of the alternative nutrient is comparable to the target nutrient amount, a match may be achieved on this basis.

It should be noted that successful matching of at least one of the above two types of matching includes: successful energy matching and/or successful nutrient amount matching. When the absolute value of the difference between the energy included in the unit packaged nutrient amount and the target energy is less than or equal to the predetermined energy difference, it represents an energy matching success. When the absolute value of the difference between the nutrient amount included in the unit packaged nutrient amount and the target nutrient amount is less than or equal to the preset nutrient amount difference, it represents successful nutrient amount matching. In addition to the absolute value of the difference, according to the practical need, it may also be determined according to a deviation range from the target energy and/or the nutrient amount, etc., for example, the deviation range is set to be less than 15%, which is not limited in the invention.

It can be seen that the above-described realization of matching the target energy and the target nutrient amount with the alternative nutrient information relies on the above-described unit packaged nutrient amount. When a proportionality relationship between the target energy and the target nutrient amount in the unit packaged nutrient amount is outside of a predetermined acceptable range, it may lead to insufficient energy or insufficient nutrient amount. In order to solve the above problem, the selection may be performed in the following manner.

In another realization of matching target energy and target nutrient amounts with information on alternative nutrients, the matching may be performed according to a proportional relationship between the energy and the nutrient amount. It includes: first, calculating a first proportionality relationship between the target energy and the target nutrient amount; then, for each alternative nutrient information, determining a second proportionality relationship between its corresponding energy concentration and the nutrient amount concentration; and finally, matching the first proportionality relationship with the second proportionality relationship corresponding to each alternative nutrient information respectively, in order to use the corresponding alternative nutrient identification as the target nutrient identification in the event of a successful matching. Matching by means of this proportionality relationship can help to further improve the feeding effect by providing as much energy and nutrient amount as possible that is suitable for feeding the target nutrient, avoiding too much or too little nutrient amount when providing energy that is suitable for feeding the target nutrient, as well as, avoiding too much or too little energy when providing nutrient amount that is suitable for feeding the target nutrient.

The second proportionality relationship may be expressed in terms of two ratios: a ratio obtained by dividing the target energy by the target nutrient amount, and a ratio obtained by dividing the target nutrient amount by the target energy.

Accordingly, the second proportionality relationship may be represented by the following two ratios: the ratio obtained by dividing the energy concentration of the alternative nutrient by the nutrient amount concentration of the alternative nutrient, and the ratio obtained by dividing the nutrient amount concentration of the alternative nutrient by the energy concentration of the alternative nutrient.

It is to be noted that matching the first proportionality relationship and the second proportionality relationship may include: the first proportionality relationship and the second proportionality relationship being the same, or the absolute value of the difference between the first proportionality relationship and the second proportionality relationship being less than or equal to a predetermined threshold value.

After determining the target nutrient by the above-described scheme, the nutrient pump may be controlled to output the target nutrient according to the target nutrient information and the target feeding amount. The invention provides two main ways to accomplish this control.

In a first realization of controlling the nutrient pump to output the target nutrient according to the target nutrient information and the target feeding amount, a user may input a feeding mode and/or a feeding parameter to control the nutrient pump to output the target nutrient according to the feeding mode and/or the feeding parameter, the target nutrient information, and the target feeding amount.

The feeding mode may include, but is not limited to, at least one of the following: continuous feeding, intermittent feeding, feeding for a specified length of time, etc., and the feeding parameters may include, but are not limited to, at least one of the following: number of feedings (feeding cycles), feeding interval, feeding rate, feeding duration, target nutrient amount, etc.

When the feeding mode is continuous feeding, the user only needs to select the feeding mode "Continuous Feeding" to determine the feeding parameters along with the preset duration corresponding to the calculation of the target feeding amount. Since feeding will then be continuous, the number of feeding cycles will be one. The feeding duration is a preset duration corresponding to the target feeding amount, such as one day. The feeding rate may be obtained by dividing the target nutrient amount by the feeding duration. The target nutrient amount may be obtained by calculating the target feeding amount and the energy and/or nutrient amount included in each unit of the target nutrient. The target feeding amount is divided by the energy included in the unit of target nutrient to obtain a first target nutrient amount, and the target feeding amount is divided by the nutrient amount included in the unit of target nutrient to obtain a second target nutrient amount. A minimum or a maximum of the first target nutrient amount and the second target nutrient amount may be used as the above-described target nutrient amount.

When the feeding mode is selected to be intermittent feeding, the corresponding number of feeding cycles may be the number of times entered by the user, or may be a default number of feeding cycles. In this case, the user inputs and thus selects feeding mode "Intermittent Feeding" and the number of feedings as well as the duration of each feeding. The total feeding duration will be the product of the duration of each feeding and the number of feedings. The feeding rate may be obtained by dividing the target nutrient amount by the feeding duration, and the target nutrient amount may be calculated according to the target feeding quantity and the energy and/or nutrient amount included in each unit of the target nutrient. The specific calculation method is as in the foregoing description and will not be repeated herein.

When the above feeding mode is feeding for a specified duration, the number of feeding cycles will also be one. The above specified duration may be a default duration or may be a feeding duration with input. In this case, the user only needs to input the feeding mode "Feeding within Specified Duration" and the feeding duration. Thus, the feeding rate may be obtained by dividing the target nutrient amount by the feeding duration, and the target nutrient amount may be calculated according to the target feeding amount and the energy and/or nutrient amount of included in each unit of the target nutrient. The specific calculation method may be as described above and will not be repeated herein.

For example, the preset duration may be days, the target feeding amount may be the feeding amount in a day, and the specified duration may be less than 24 hours. For example, it may be 8 hours, in order to perform a feeding every day and each feeding needs to be completed over a period of 8 hours.

The user may also directly input the feeding parameters, e.g., input at least one of the feeding rate, the number of feedings, the feeding duration, and the target nutrient amount directly to control the nutrient pump to output the target nutrient.

When the feeding parameter entered by the user is a feeding rate, the nutrient pump may be controlled to output the target nutrient in accordance with the feeding rate.

When the feeding parameter input by the user includes at least one of feeding times, the feeding duration, and the target nutrient amount, it is necessary to determine the feeding rate, in order to control the nutrient pump to output the target nutrient. The relationship between the feeding rate and the above-mentioned feeding times, feeding duration, and target nutrient amount may be as described above, although this will vary.

In one embodiment, step S2033 may include the following steps.

S20331, a feeding mode and/or a feeding parameter is determined according to the target feeding amount and the target nutrient information, or according to the target feeding amount, the target nutrient information, and the feeding subject information.

S20332, the nutrient pump is controlled to output the target nutrient according to the feeding mode and/or the feeding parameters.

Embodiments of the invention may intelligently recommend the feeding mode and/or feeding parameters to improve the quality of feeding and reduce the complexity of user operation.

The feeding mode may be determined by combining at least one or more of the target feeding amount, the target nutrient identification, the feeding subject information, and the target nutrient information. That is, when at least one of the items of information, namely the target feeding amount, the target nutrient identification, the feeding subject information, and the target nutrient information, is different, then the feeding mode may be different. For example, when the target feeding amount is large, then using the continuous feeding mode may be preferable. When the target feeding amount is small, however, the intermittent feeding mode may be preferred. In addition, for different target nutrients, their suitable feeding modes may be flexibly set according to their characteristics, or further combined with the feeding subject information. For feeding subjects with a large body weight, the continuous feeding mode may be used, while for feeding subjects with a small body weight, the intermittent feeding mode may be preferred. For feeding subjects with serious diseases, the continuous feeding mode may be used, while for feeding subjects with less serious diseases, the intermittent feeding mode may be used. The specific realization may be set according to the specific situation.

The feeding parameters may be determined by combining at least one or more of the target feeding amount, the target nutrient information, the feeding mode, and the feeding subject information. That is, when at least one of the items of information, namely, the target feeding amount, the target nutrient identification, the feeding mode, and the feeding subject information, is different, the determined feeding parameters may be different, which is more targeted and enables accurate feeding. For example, for different days of feeding of the same feeding subject, the feeding subject information may be different due to the fact that the physical state of its feeding subject may be different on different days, which may result in different feeding subject information, and thus different feeding modes and/or feeding parameters. As the feeding subject becomes more physically fit with nutritional feeding, the feeding parameters may change incrementally to increase the target feeding amount. As another example, for different feeding subjects, the weight, age, height, gender, disease information, etc. in their feeding subject information is different, thus corresponding to different feeding parameters. When the feeding modes are different, such as the continuous feeding mode and the interval feeding mode, the feeding rate, the number of feeding times, etc. in the feeding parameters may also be different. The proper feeding mode and its parameters may be set according to the specific situation.

In some embodiments, after determining the target feeding amount according to the feeding subject information, a feeding amount ratio may also be obtained to adjust the target feeding amount according to a feeding amount ratio. When the feeding amount ratio is 100%, the full amount of the predicted target feeding quantity may be fed to the feeding subject. When the feeding amount ratio is less than 100%, the feeding amount can be reduced accordingly. When the feeding amount ratio is greater than 100%, an appropriate increase in the feeding amount can be carried out. In this way, the feeding ratio may be set on the basis of the feeding subject information in combination with special feeding scenarios to realize further flexible adjustment of the target feeding amount, which helps to improve the feeding flexibility and the feeding effect.

In some scenarios, the aforementioned feeding subject information may include information such as basic information, vital sign information, disease information, laboratory result information, and remaining ingestion information other than the target nutrient. In this case, these factors may have already been taken into account in the target feeding amount determined according to the feeding subject information, and thus the determined target feeding amount may not need to be adjusted again.

However, when the feeding subject information does not include all desired information such as basic information, vital sign information, disease information, laboratory result information, and remaining ingestion information other than the target nutrient, the target feeding amount determined according to the feeding subject information may be further adjusted by means of the information not included in the feeding subject information. The information not included in the feeding subject information may be any or all of, for example, the aforementioned basic information, vital sign information, disease information, laboratory result information, and remaining ingestion information other than the target nutrient.

The steps of further adjustment may be achieved by feeding ratios and/or adjustment factors. The feeding ratio may be flexibly set according to the information not included in the above-described feeding target information, and the adjustment factor includes the information not included in the above-described feeding target information.

In one example, when the disease information is not included in the feeding subject information, one way of adjustment is that the feeding ratio may be set along with the disease information to further improve the correctness of the target feeding amount according to the feeding subject information to determine the target feeding amount. The other way is to use the disease information as a kind of adjustment factor to be further adjusted by the feeding ratio and the adjustment factor. The disease information may include, but is not limited to: type of disease, stage of disease severity, number of days of admission, and hemodynamic parameters.

In another example, when the remaining ingestion information is not included in the feeding subject information, one way of adjustment is that a feeding ratio may be set along with the remaining ingestion information to further improve the correctness of the target feeding amount according to the feeding subject information to determine the target feeding amount. Another way is to use the remaining ingestion information as an adjustment factor to further adjust the target feeding amount by the feeding ratio and use the adjustment factor for further adjustment. The remaining ingestion information may include energy included in the remaining ingestion and/or the nutrient amount included in the remaining ingestion.

The feeding ratio may be information input by the user or may be pre-calculated according to a special feeding scenario.

In some embodiments, in order to better monitor the feeding progress, the fed amount corresponding to the current time may be obtained periodically or at regular intervals during the feeding process to display the fed amount and the target feeding amount.

Similar to the target feeding amount, the fed amount may include: fed energy content, fed nutrient amount. The fed energy content may be compared to the target energy in the target feeding amount to monitor the progress of energy feeding. The fed nutrient amount is compared to the target nutrient amount in the target feeding amount to monitor the feeding progress of the nutrient amount. Thus, the feeding progress can be better monitored and the feeding accuracy can be improved by the above comparative display.

In summary, the embodiments of the invention preferably require the client to display and input some information during the realization process. Some example diagrams of the client interface are shown below, with protein as an example of nutrition in the diagrams.

Figure 5:
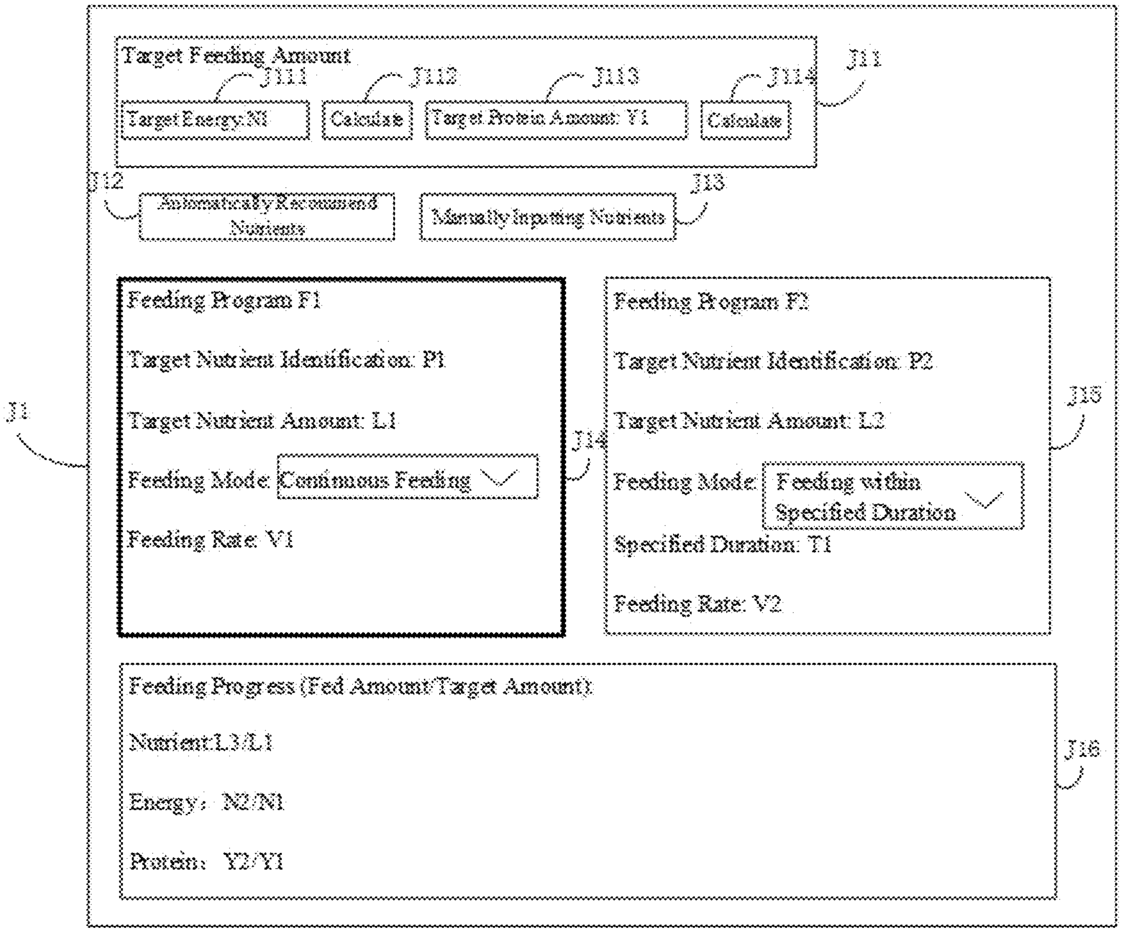
FIG. 5 is a schematic diagram showing a layout of a client interface J1 according to an embodiment of the invention.

FIG. 5 is a schematic diagram showing a layout of a client interface J1 according to an embodiment of the invention. As shown in FIG. 5, a region J11 in the client interface J1 may display a target feeding amount, including a target energy content N1 in the region J111 and a target protein amount Y1 in the region J113. The target energy content N1 and the target protein amount Y1 can be calculated, and the target energy content and the target protein may be defaulted to be null or 0 when this client interface J1 is initially turned on. As shown in FIG. 5, when the user clicks on the "Calculate" control in the region J112, a jump is made to the client interface J2 shown in FIG. 6 to calculate the target energy content N1. When the user clicks on the "Calculate" control in the region J114, a jump is made to the client interface J3 shown in FIG. 7 to calculate the target protein amount Y1.

The units of the target energy content and target protein amount may be set flexibly, and the unit of the target energy content may be exemplarily kcal/day (kilocalorie/day), and the unit of the target nutrient amount may be, for example, g/day (gram/day).

As shown in FIG. 5, in the above-described client interface J1, after calculating the above-described target energy content N1 and target protein amount Y1, when the user operates the operation control "Automatically Recommend Nutrients" in the region J12 of the client interface J1, the target energy content N1 and target protein amount Y1 may be automatically recommended according to the target energy content N1 and target protein amount Y1. When the user operates the operation control "Manually Inputting Nutrients" in the region J13 of the client interface J1, any or all alternative nutrient identifications may be displayed for selection by the user, or the user can directly input the target nutrient identification.

When the target nutrient is acquired as described above, at least one feeding program may be selected, and the feeding program may include but is not limited to at least one of the following: target nutrient information, feeding parameters, feeding mode. When at least one item is different, it corresponds to a different feeding program. Each target nutrient identification corresponds to at least one feeding program. As shown in FIG. 5, regions J14 and H15 show two feeding programs F1 and F2, respectively.

As shown in FIG. 5, feeding program F1 is the feeding program corresponding to the target nutrient identification P1, the target nutrient amount of feeding program F1 is L1. The user sets the feeding mode of feeding program F1 to "Continuous Feeding", and the feeding rate of feeding program F1 is V1.

As shown in FIG. 5, feeding program F2 is a feeding program corresponding to the target nutrient identification P2, the target nutrient amount of feeding program F2 is L2. The user sets the feeding mode of feeding program F2 to "Feeding within Specified Duration", the specified duration is set to T1, and the corresponding feeding rate of feeding program F2 is V2.

In the client interface shown in FIG. 5, the user can select any one of the feeding programs for controlling the nutrient pump to perform feeding. For example, as shown in FIG. 5, the feeding program selected by the user is F1.

When the target nutrient identification, feeding parameters, feeding mode, etc., of the invention are determined by an external device for controlling the nutrient pump, the feeding program may also be selected by the control device, which sends the feeding program to the nutrient pump. When the target nutrient identification, the feeding parameters, the feeding mode and the like of the invention are determined by the nutrient pump, the feeding program may also be selected by the nutrient pump, which may itself execute the feeding program.

As can be seen from the foregoing description, when the feeding subject information includes at least one of the following: the basic information, vital sign information, disease information, laboratory result information, and remaining ingestion information other than the target nutrient, the target feeding amount may be determined according to the feeding subject information, and thus the most appropriate feeding program can be determined. When the feeding subject information includes a feeding subject type as well as a disease type, an appropriate feeding program may also be determined according to the feeding subject information. The determined feeding program may be displayed in the client interface to enable the user to select the feeding program for feeding. If the feeding program is not selected after this determination, a default feeding program may also be displayed as the feeding program in the client interface for the user to select. The default feeding program may be sent by an external system or may be installed in the nutrient pump at the factory.

As shown in FIG. 5, after the user selects one of the feeding programs, feeding progress may also be displayed in real time in the region J16 of the client interface J1, including the feeding progress with respect to three main categories: the feeding progress of the nutrient, the feeding progress of the energy, and the feeding progress of the protein. As shown in FIG. 5, the feeding progress may be used to compare the fed amount to the target feeding amount. For example, the feeding progress of the nutrient may be represented by the fed nutrient amount L3/target nutrient amount L1, the feeding progress of the energy content may be represented by the fed energy N2/target energy content N1, and the feeding progress of the protein may be represented by the fed protein amount Y2/target protein amount Y1.

The fed nutrient amount L3, the fed energy content N2 and the fed protein amount Y2 may be 0 initially and increase as feeding progresses.

Figure 6:
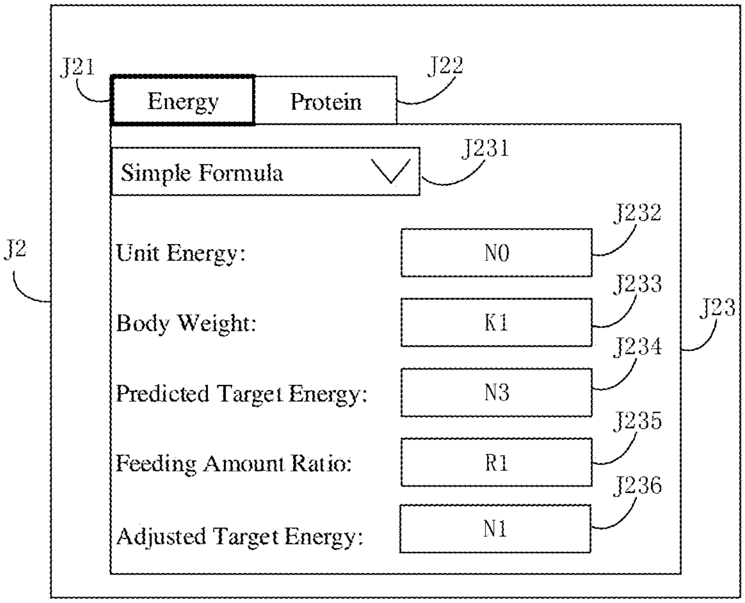
FIG. 6 is a schematic diagram showing a layout of a client interface J2 according to an embodiment of the invention.

After the user operates the operation control "Calculate" next to the target energy content shown in FIG. 5, a jump is made to a client interface J2 shown in FIG. 6, which is an interface for calculating the target energy content.

As shown in FIG. 6, in the client interface J2, the prompt labels "Energy" and "Protein" are displayed in the region J21 and region J22, respectively, to indicate whether the current calculation is for energy content or protein amount. The region J23 is configured to display the detailed calculation interface. As shown in FIG. 6, the "Simple Formula" is used as the target formula for calculating the target feeding amount in region J231 by default. In this circumstance, the user needs to input the unit energy NO and the weight K1 in the regions J232 and J233 in the client interface J2, respectively. The unit energy may be the energy required per unit of body weight, and the unit energy and the body weight may be set to have a default value, which may be adjusted by the user. Thus, the simple formula can use the product N0×K1 of the unit energy N0 and body weight K1 as the predicted target energy content N3, which is displayed in the region J234.

As can also be seen in FIG. 6, the user can also enter a feeding amount ratio in region J235. For example, if the feeding amount ratio shown in FIG. 6 is R1, then the product R1×N3 of the feeding amount ratio R1 and the predicted target energy N3 can be used as the adjusted target energy content N1, which is the target energy content N1 in region J236 in client interface J1 shown in FIG. 5.

The above-described client interface J2 may be a default interface for calculating the target energy, and the user may adjust the target formula in the client interface J2 and select the rest of the formulas other than the Simple Formula for calculating the target energy content. When the target formula adjusted by the user in the above client interface J2 is Harris-Benedict, a jump is made to a client interface J3 as shown in FIG. 7 in order to calculate the target energy content according to Harris-Benedict.

Figure 7:
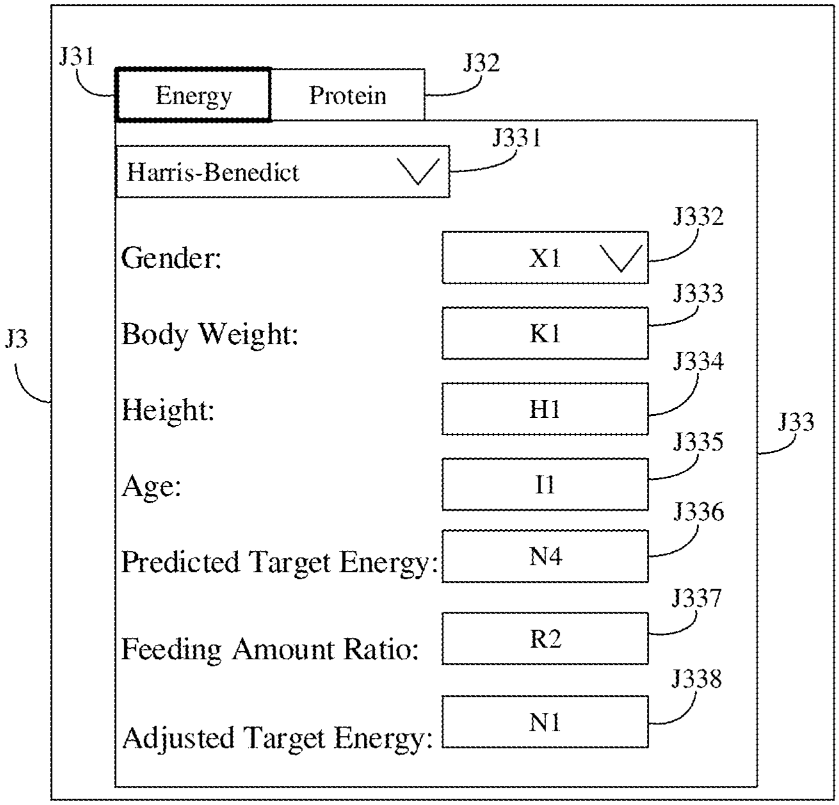
FIG. 7 is a schematic diagram showing a layout of a client interface J3 according to an embodiment of the invention.

In the example shown in FIG. 7, the client interface J3 includes regions J31, J32, and J33. The regions J31 and J32 display the prompt labels "Energy" and "Protein", respectively, to indicate whether the current calculation is for energy content or protein amoutn. The region J33 is configured to display the detailed calculation interface. As shown in FIG. 7, for the Harris-Benedict formula in region J331, the information to be inputted in regions J332 to J335 include: gender X1, weight K1, height H1, and age I1. These inputted information may also be set to default values, and the user can adjust the default values. The Harris-Benedict formula can be used to calculate the predicted target energy content N4 in the region J336 based on gender X1, weight K1, height H1, and age I1.

As can also be seen in FIG. 7, the user may also enter a feeding amount ratio in region J337. For example, if the feeding amount ratio shown in FIG. 7 is R2, then the product of the feeding amount ratio R2 and the predicted target energy content N4, R2×N4, can be used as the adjusted target energy content N1 in region J338, which is also the target energy content N1 in the client interface J1 shown in FIG. 5.

It will be appreciated that the user may select the remaining target formulas in the client interface J2 or further adjust the target formulas in the client interface J3 to access the client interface corresponding to the selected target formulas. Different target formulas may correspond to different client interfaces.

FIGS. 6 and 7 above are examples of client interfaces for calculating the target energy content. When the user operates the operation control "Calculate" next to the target protein amount in the client interface J1, a jump is made to the client interface shown in FIG. 8 to calculate the protein amount.

Figure 8:
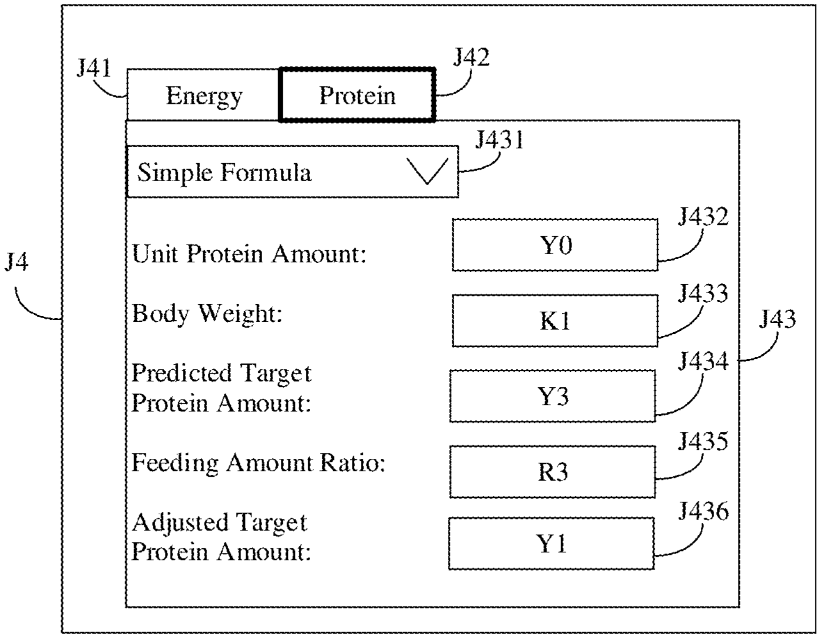
FIG. 8 is a schematic diagram showing a layout of a client interface J4 according to an embodiment of the invention.

As shown in FIG. 8, the client interface J4 includes regions J41, J42, and J43. The regions J41 and J42 display the prompt labels "Energy" and "Protein", respectively, to indicate whether the current calculation is for energy content or protein amount. The region J43 is configured to display the detailed calculation interface. In region J431, the simple formula is used as the target formula for calculating the amount of protein by default. In this circumstance, the user needs to enter the unit protein amount Y0 and body weight K1 in regions J432 and J433, respectively. The unit protein amount may be the protein amount needed per unit of body weight, and the unit protein amount and body weight may be set to a default value, which can be adjusted by the user. Thus, the simple formula can use the product Y0×K1 of the unit protein amount Y0 and body weight K1 as the predicted target protein amount Y3 in region J434.

As can also be seen in FIG. 8, the user can also enter a feeding amount ratio in region J435. For example, if the feeding amount ratio shown in FIG. 8 is R3, then the product of the feeding amount ratio R3 and the predicted target protein amount Y3, R3×Y3, can be used as the adjusted target protein amount Y1 in region J436, which is the target protein amount Y1 in the client interface J1 shown in FIG. 5.

The above client interface J4 may be the default interface for calculating the target protein amount, and the user may also adjust the target formula in the client interface J4 and select the rest of the formulas other than the simple formula for calculating the target protein amount. Correspondingly, a jump is made to the client interface corresponding to that formula for calculating the target protein amount for inputting the information needed for that formula.

After obtaining the target energy and the target protein amount through the above client interface shown in FIGS. 6 to 8, respectively, a return may be made to the client interface J1 shown in FIG. 5. In this circumstance, the target nutrient identifications may be intelligently determined according to the target energy and the target protein amount in order to obtain the two feeding programs F1 and F2.

Figure 9:
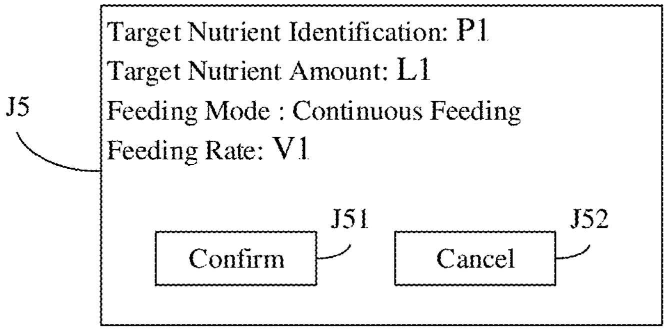
FIG. 9 is a schematic diagram showing a layout of a client interface J5 according to an embodiment of the invention.

After the user confirms one of the feeding programs F1, a jump may be made to the client interface J5 shown in FIG. 9 to confirm again whether to adopt the feeding program F1. As shown in FIG. 9, the client interface shows the details of the feeding program F: target nutrient identification P1, target nutrient amount L1, feeding mode "Continuous Feeding", and feeding rate V1. In addition, two operation controls "Confirm" and "Cancel" are displayed in regions J51 and J52 of the client interface. When the user operates the operation control "Confirm", the feeding program F1 can be used as the feeding program to control the nutrient pump to output the target nutrient. After the user operates the operation control "Cancel", a return may be made to the client interface J1 shown in FIG. 5 to re-select the feeding program.

Figure 10:
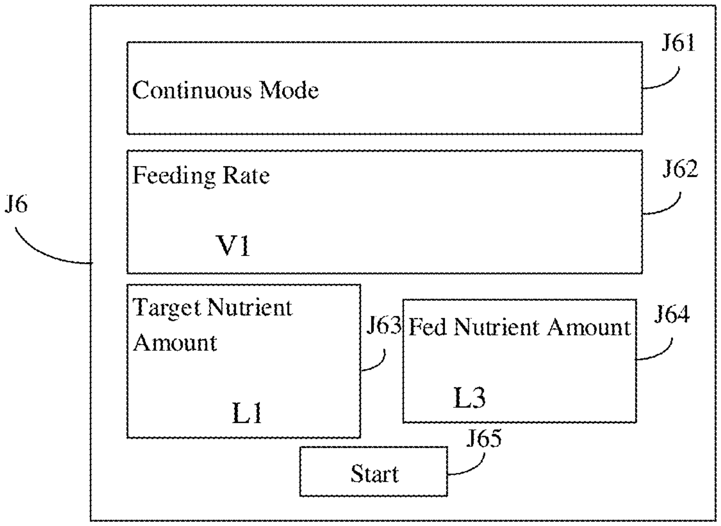
FIG. 10 is a schematic diagram showing a layout of a client interface J6 according to an embodiment of the invention.

After the user operates the operation control "Confirm" in the client interface J5 shown in FIG. 9, the client interface J6 shown in FIG. 10 can be displayed on the nutrient pump. As shown in FIG. 10, the client interface J6 displays the details of the feeding program F1: feeding mode "Continuous Mode" in the region J61, the feeding rate 'V1' in region J62, the target nutrient amount 'L1' in region J63, the fed nutrient amount 'L3' in region J64, and the fed nutrient amount 'L3' in region J64. In addition, an operation control "Start" is displayed in the region J65 of the client interface J6 to start outputting the target nutrient in accordance with the feeding program F1 by controlling the nutrient pump after the user has operated thereon, so as to carry out the feeding.

It should be noted that the amount of fed nutrient may be zero initially, and then gradually increase as feeding proceeds, with L3 being less than or equal to L1.

Figure 11:
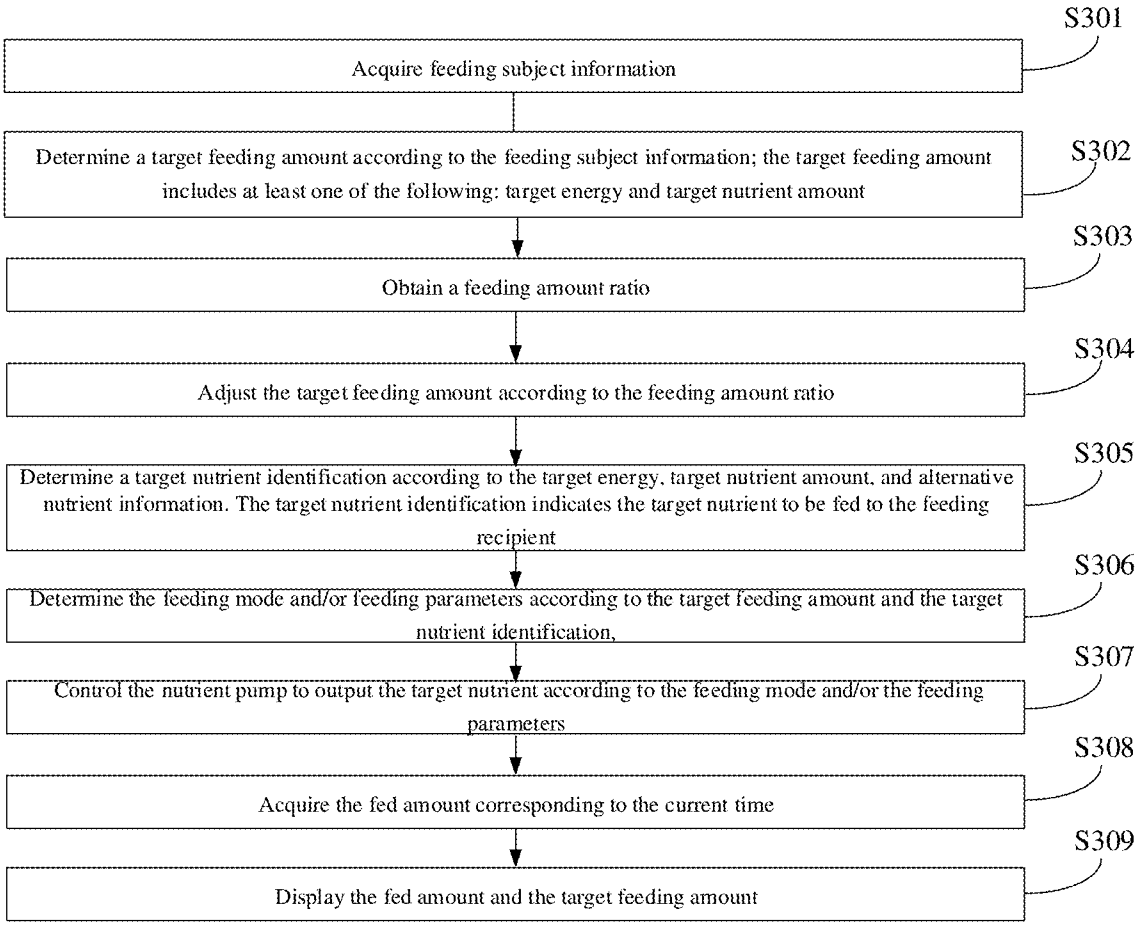
FIG. 11 is a flowchart of another method for controlling a nutrient pump according to an embodiment of the invention.

FIG. 11 is a flowchart of another method for controlling the nutrient pump according to an embodiment of the invention. As shown in FIG. 11, the method may include steps S301 to S309.

S301, feeding subject information is acquired.

S302, a target feeding amount is determined according to the feeding subject information. The target feeding amount includes at least one of the following: target energy and target nutrient amount.

S303, a feeding amount ratio is obtained.

S304, the target feeding amount is adjusted according to the feeding amount ratio.

S305, a target nutrient identification is determined according to the target energy content, target nutrient amount, and alternative nutrient information. The target nutrient identification indicates the target nutrient to be fed to the feeding recipient.

S306, according to the target feeding amount and the target nutrient identification, the feeding mode and/or feeding parameters are determined.

S307, the nutrient pump is controlled to output the target nutrient according to the feeding mode and/or the feeding parameters.

S308, the fed amount corresponding to the current time is acquired.

S309, the fed amount and the target feeding amount are displayed.

The order between the above S301 to S309 may be flexibly adjusted on the basis of non-interdependence, and the above S301 to S309 may be described in detail with reference to the foregoing S201 to S203, and will not be repeated herein. S303, S304, S308 and S309 are optional steps.

Figure 12:
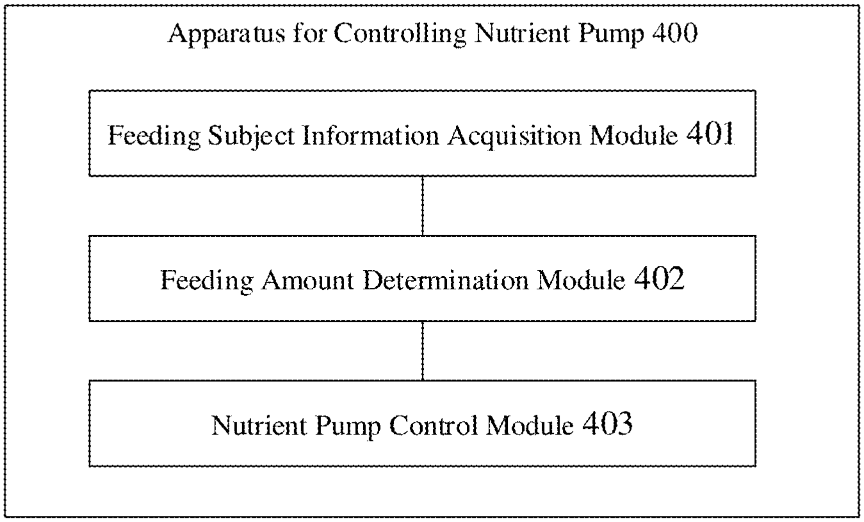
FIG. 12 is a block diagram of an apparatus for controlling a nutrient pump according to an embodiment of the invention.

Corresponding to the method for controlling the nutrient pump of the above embodiment, FIG. 12 is a block diagram of an apparatus for controlling a nutrient pump according to an embodiment of the invention. For ease of illustration, only the portions relevant to the embodiments of the invention are shown. As shown in FIG. 12, the above-described control apparatus 400 includes the following modules.

A feeding subject information acquisition module 401 is configured to acquire feeding subject information.

A feeding amount determination module 402 is configured to determine a target feeding amount according to the feeding subject information. The target feeding amount includes at least one of the following: target energy content and target nutrient amount.

A nutrient pump control module 403 is configured to control the nutrient pump to output a target nutrient according to the target feeding amount.

In some embodiments, the nutrient pump control module 403 is further configured to:

- obtain target nutrient information; and
- control the nutrient pump to output the target nutrient according to the target nutrient information and the target feeding amount.

In some embodiments, the nutrient pump control module 403 is further configured to:

- determine a feeding mode and/or a feeding parameter according to the target feeding amount and the target nutrient information, or according to the target feeding amount, the target nutrient information and the feeding subject information; and
- control the nutrient pump to output the target nutrient according to the feeding mode and/or the feeding parameter.

In some embodiments, the apparatus further includes the following modules.

A ratio obtaining module is configured to obtain a feeding amount ratio after the target feeding amount is determined according to the feeding subject information

- a feeding amount adjustment module is configured to adjust the target feeding amount according to the feeding amount ratio.

In some embodiments, the feeding subject information includes at least one of the following: basic information, vital sign information, disease information, laboratory result information, and remaining ingestion information other than the target nutrient.

The basic information includes at least one of the following: height, weight, gender, and age; the vital sign information includes at least one of the following: oxygen consumption and carbon dioxide production; the disease information includes at least one of the following: disease type, disease severity stage, number of days of hospitalization, and hemodynamic parameter; and the remaining ingestion information includes at least one of the following: energy included in the remaining ingestion, nutrient amount included in the remaining ingestion.

In some embodiments, the nutrient pump control module 403 is further configured to:

- determine the target nutrient information according to the target energy content, the target nutrient amount and alternative nutrient information.

In some embodiments, the apparatus further includes the following modules.

A fed amount acquisition module is configured to acquiring the fed amount corresponding to the current time.

A feeding amount display module configured to display the fed amount and the target feeding amount.

Figure 13:
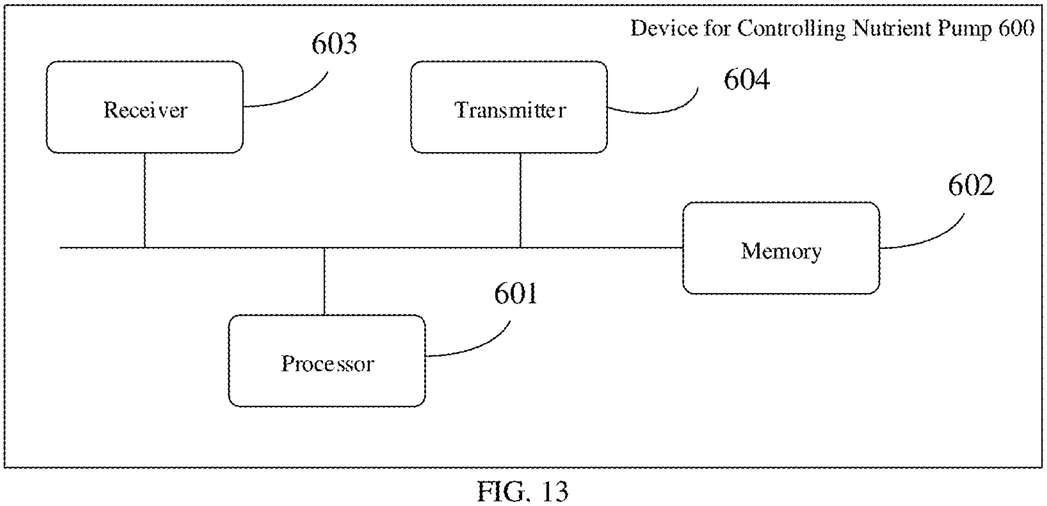
FIG. 13 is a block diagram of a device for controlling a nutrient pump according to an embodiment of the invention.

FIG. 13 is a block diagram of a device for controlling a nutrient pump according to an embodiment of the invention. The device 600 for controlling the nutrient pump includes a memory 602 and at least one processor 601.

The memory 602 is configured to store computer-executable instructions. The at least one processor 601 is configured to process the computer-executable instructions stored in the memory 602 to cause the device 600 to implement the method for controlling the nutrient pump.

In addition, the nutrient pump control device may also include a receiver 603 and a transmitter 604. The receiver 603 is configured to receive information from other devices or equipment and forward it to the processor 601, and the transmitter 604 is configured to transmit the information to other devices or equipment.

Embodiments of the invention further provide (see FIG. 1) a feeding system including: delivery tubing, a driving mechanism, and at least one processor and a memory. The memory is configured to store computer-executable instructions, and the processor is configured to process the computer-executable instructions stored in the memory to cause the device to implement the method for controlling the nutrient pump.

Embodiments of the invention also provide a computer-readable storage medium, the computer-readable storage medium storing computer-executable instructions to cause the electronic device to implement the foregoing method for controlling the nutrient pump when the processor processes the computer-executable instructions.

Embodiments of the invention further provide a computer program for implementing the foregoing method for controlling the nutrient pump.

Finally, it should be noted that the above embodiments are only used to illustrate the technical solutions of the invention, not to limit them. Although the invention has been described in detail with reference to the foregoing embodiments, a person of ordinary skill in the art should understand that it is still possible to modify the technical solutions documented in the foregoing embodiments, or to make equivalent replacements for some or all of the technical features therein; and the modifications or substitutions do not take the essence of the corresponding technical solutions out of the scope of the technical solutions of the embodiments of the invention.

The invention claimed is:

1. A method of controlling a nutrient pump, comprising:

obtaining feeding subject information;

determining a target feeding amount according to the feeding subject information, wherein the target feeding amount comprises both target energy content and a target nutrient amount;

selecting a target nutrient from among a plurality of alternative nutrients to be the one of the alternative nutrients that has a highest degree of correspondence with at least one of the target energy content and the target nutrient amount;

controlling the nutrient pump to output the target nutrient according to the target feeding amount;

wherein the feeding subject information comprises at least two of the following: basic information, vital sign information, disease information, laboratory result information, and remaining ingestion information other than the target nutrient;

the basic information comprises at least one of the following: height, weight, gender, and age;

the vital sign information comprises at least one of the following: oxygen consumption and carbon dioxide production; and the disease information comprises at least one of the following: disease type, disease severity stage, number of days of hospitalization, and hemodynamic parameter; and the remaining ingestion information comprises at least one of the following:

energy included in the remaining ingestion information and nutrient amount included in the remaining ingestion information.

2. The method of claim 1, wherein the step of controlling the nutrient pump to output the target nutrient according to the target feeding amount comprises:

obtaining target nutrient information; and controlling the nutrient pump to output the target nutrient according to the target nutrient information and the target feeding amount.

3. The method of claim 2, wherein the step of controlling the nutrient pump to output the target nutrient according to the target nutrient information and the target feeding amount comprises:

determining a feeding mode and/or a feeding parameter according to the target feeding amount and the target nutrient information, or according to the target feeding amount, the target nutrient information and the feeding subject information; and controlling the nutrient pump to output the target nutrient according to the feeding mode and/or the feeding parameter.

4. The method of claim 2, wherein the step of obtaining the target nutrient information comprises:

determining the target nutrient information according to the target energy content, the target nutrient amount and alternative nutrient information.

5. The method of claim 1, wherein after the step of determining the target feeding amount according to the feeding subject information, the method further comprises:

obtaining a feeding amount ratio;

adjusting the target feeding amount according to the feeding amount ratio.

6. The method of claim 1, further comprising:

acquiring a fed amount corresponding to a current time; and displaying the fed amount and the target feeding amount.

7. A device for controlling a nutrient pump, comprising: at least one processor and a memory;

the memory is configured to store computer-executable instructions;

the at least one processor is configured to process the computer-executable instructions stored in the memory to cause the device to:

obtain feeding subject information including at least two of basic patient information, vital sign information, disease information, laboratory result information, and remaining ingestion information, in which the basic patient information includes at least one of height, weight, gender, and age;

determine a target feeding amount according to the feeding subject information, wherein the target feeding amount comprises both target energy content and a target nutrient amount;

select a target nutrient from among a plurality of alternative nutrients to be the one of the alternative nutrients that has a highest degree of correspondence with at least one of the target energy content and the target nutrient amount;

control the nutrient pump to output a target nutrient according to the target feeding amount;

wherein the feeding subject information comprises at least two of the following: the basic information, the vital sign information, the disease information, the laboratory result information, and the remaining ingestion information other than the target nutrient;

the basic information comprises at least one of the following: height, weight, gender, and age;

the vital sign information comprises at least one of the following: oxygen consumption and carbon dioxide production; and the disease information comprises at least one of the following: disease type, disease severity stage, number of days of hospitalization, and hemodynamic parameter; and the remaining ingestion information comprises at least one of the following: energy included in the remaining ingestion information and nutrient amount included in the remaining ingestion information.

8. The device of claim 7, wherein the device controls the nutrient pump to output the target nutrient according to the target feeding amount by:

obtaining target nutrient information; and controlling the nutrient pump to output the target nutrient according to the target nutrient information and the target feeding amount.

9. The device of claim 8, wherein the device controls the nutrient pump to output the target nutrient according to the target nutrient information and the target feeding amount by:

determining a feeding mode and/or a feeding parameter according to the target feeding amount and the target nutrient information, or according to the target feeding amount, the target nutrient information and the feeding subject information; and controlling the nutrient pump to output the target nutrient according to the feeding mode and/or the feeding parameter.

10. The device of claim 8, wherein the device obtains the target nutrient information by:

determining the target nutrient information according to the target energy content, the target nutrient amount and alternative nutrient information.

11. The device of claim 7, wherein after determining the target feeding amount according to the feeding subject information, the device further:

obtains a feeding amount ratio; and adjusts the target feeding amount according to the feeding amount ratio.

12. The device of claim 7, wherein the device further:

acquires a fed amount corresponding to a current time; and displays the fed amount and the target feeding amount.

13. A feeding system, comprising: a delivery tubing, a driving mechanism, and at least one processor and a memory; the memory is configured to store computer-executable instructions; and the processor is configured to process the computer-executable instructions stored in the memory to cause the system to:

obtain feeding subject information;

determine a target feeding amount according to the feeding subject information, wherein the target feeding amount comprises at least one of the following: target energy content and a target nutrient amount;

select a target nutrient from among a plurality of alternative nutrients to be the one of the alternative nutrients that has a highest degree of correspondence with at least one of the target energy content and the target nutrient amount;

control a nutrient pump to output the target nutrient according to the target feeding amount;

wherein the feeding subject information comprises at least two of the following: basic information, vital sign information, disease information, laboratory result information, and remaining ingestion information other than the target nutrient;

wherein the basic information comprises at least one of the following: height, weight, gender, and age;

the vital sign information comprises at least one of the following: oxygen consumption and carbon dioxide production; the disease information comprises at least one of the following: disease type, disease severity stage, number of days of hospitalization, and hemodynamic parameter; and the remaining ingestion information comprises at least one of the following: energy included in the remaining ingestion information and nutrient amount included in the remaining ingestion information.

* * * * *